United States Patent [19]
Beebe et al.

[11] Patent Number: 5,309,373
[45] Date of Patent: May 3, 1994

[54] APPARATUS AND METHOD FOR WIND-CORRECTED MEASUREMENT OF STEERING PULL ON A VEHICLE

[75] Inventors: James C. Beebe, Kent; Barry D. Cargould, Hudson, both of Ohio

[73] Assignee: Illinois Tool Works Inc., Glenview, Ill.

[21] Appl. No.: 95,153

[22] Filed: Jul. 19, 1993

Related U.S. Application Data

[60] Division of Ser. No. 770,110, Oct. 2, 1991, which is a continuation-in-part of Ser. No. 556,951, Jul. 23, 1990, Pat. No. 5,229,954.

[51] Int. Cl.$^5$ .................. B60R 27/00; G06F 15/20
[52] U.S. Cl. .................. 364/506; 364/551.01; 73/170.11
[58] Field of Search ........... 364/506, 509, 510, 424.01, 364/424.05, 550, 551.01, 571.01, 571.02, 571.03; 73/170.11, 170.07, 170.08, 147; 180/141

[56] References Cited

U.S. PATENT DOCUMENTS

| | | | |
|---|---|---|---|
| 4,810,022 | 3/1989 | Takagi et al. | 296/180.5 |
| 5,048,630 | 9/1991 | Schaffer | 180/142 |
| 5,119,673 | 6/1992 | Tran et al. | 73/182 |

*Primary Examiner*—Thomas G. Black
*Assistant Examiner*—Michael Zanelli
*Attorney, Agent, or Firm*—Ruden, Barnett, McClosky, Smith, Schuster & Russell

[57] ABSTRACT

Steering pull to which a vehicle is subjected due to tire non-uniformity is measured accurately even in the presence of wind. An anemometer mounted in proximity of and in positionally fixed relation to the vehicle measures the speed and direction of wind apparent to the vehicle. Those measurements are used by a computer to determine a wind correction quantity which is subtracted from the steering pull measured at the steering wheel.

4 Claims, 1 Drawing Sheet

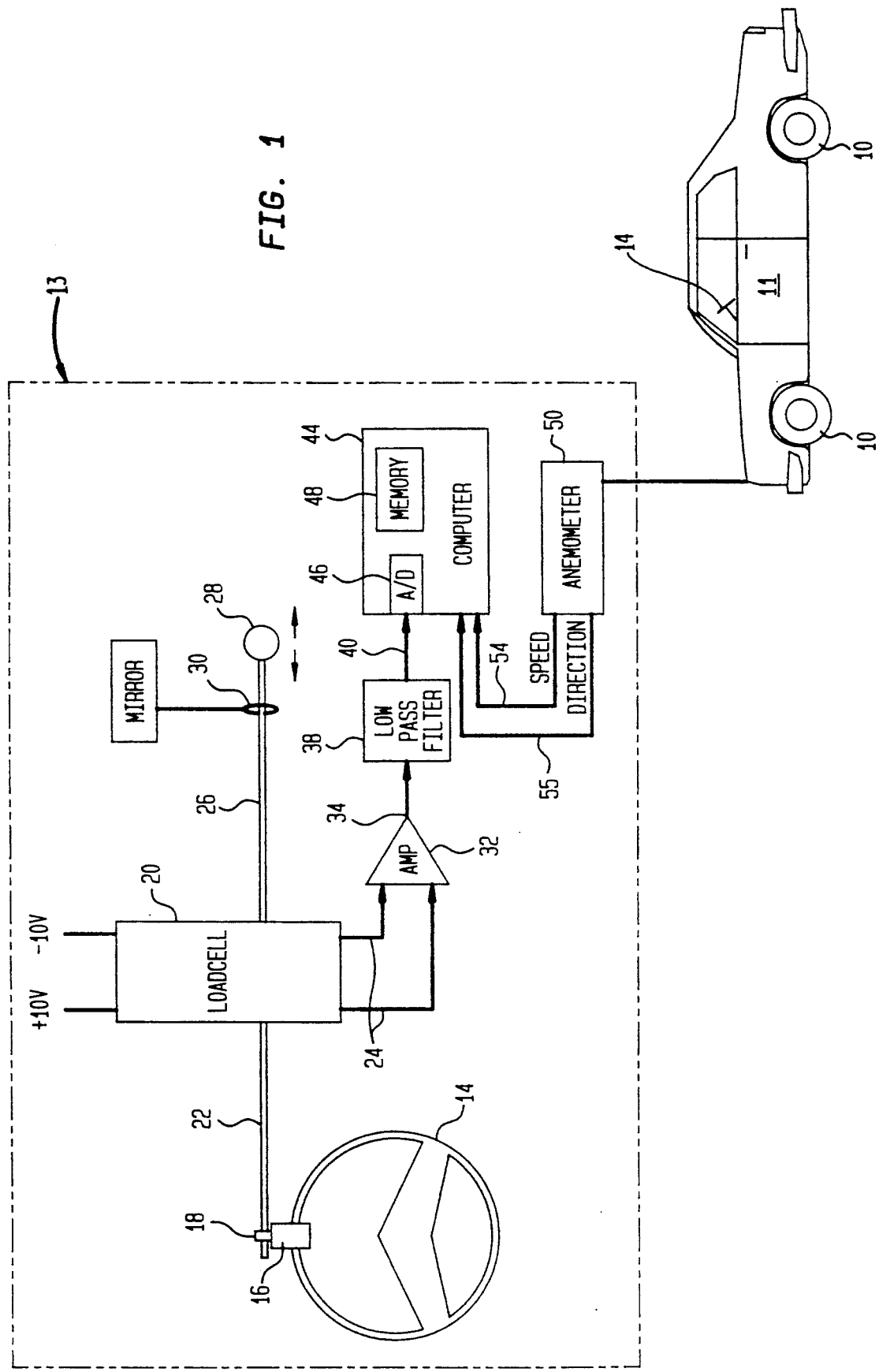

APPARATUS AND METHOD FOR WIND-CORRECTED MEASUREMENT OF STEERING PULL ON A VEHICLE

CROSS REFERENCE TO RELATED APPLICATIONS

This is a divisional of co-pending, commonly assigned U.S. patent application Ser. No. 07/770,110, filed Oct. 2, 1991 which, in turn is a continuation-in-part of co-pending, commonly assigned U.S. patent application Ser. No. 07/556,951 filed Jul. 23, 1990, now U.S. Pat. No. 5,229,954, both of which are expressly incorporated herein by reference in their entireties.

FIELD OF THE INVENTION

The invention relates to the field of measuring steering pull on vehicles. More particularly, the present invention relates to an apparatus and method for accurate, on-vehicle measurement of steering pull in the presence of wind.

BACKGROUND OF THE INVENTION

Structural nonuniformities in vehicle tires can give rise to an undesirable phenomenon known as "steering pull." Steering pull refers to the tendency of a vehicle traveling forward to veer to the right or left in the absence of a corresponding steering input from its driver.

The steering pull exhibited by a vehicle due to non-uniformity of its tires is attributable almost entirely to behavior of the tires mounted on the steering axle. The tendency of a tire on one end of the axle to cause steering pull algebraically adds to or subtracts from the corresponding tendency of the tire on the other end of the axle. In order to illustrate this, it is useful to first note that tires have a pair of opposed sides which are commonly referred to as the "in-side" (or D.O.T. marking side) and the "out-side" (sometimes referred to as "curb side" or "whitewall side"). Assume for illustration purposes that the tire mounted on the left side of the front axle of a vehicle, such as passenger car, tends to veer toward its out-side to such a degree that in order to keep the vehicle traveling straight, a 5 ounce clockwise steering pull force must be applied by the driver to the perimeter of the steering wheel of the car. Further assume that the tire on the opposite end of the same axle tends to pull in the opposite direction, i.e., toward the in-side, with a steering pull of the same magnitude. Since the tires are mounted at opposite ends of the axle, each would tend to cause the car to tend to veer leftwardly and, in order to keep the vehicle traveling straight, the driver would have to exert a distinctly noticeable total steering pull of 10 ounces on the steering wheel in the clockwise direction. However, if only one of these tires was replaced with a tire exhibiting the same degree of steering pull but in the opposite direction of its predecessor, i.e., in the same direction as the tire on the opposite end of the steering axle, the driver would not have to exert any force on the steering wheel to keep the vehicle traveling straight ahead. No annoying steering pull would then be apparent to the driver notwithstanding the tendency of each individual tire to cause steering pull.

Steering pull can be quantified by measuring the magnitude and direction of force which the driver must apply at the perimeter of the steering wheel in one direction or the other in order to keep the vehicle traveling straight ahead.

To reduce customer complaints and resolve warranty claims, manufacturers of tires and vehicles need to be able to determine whether non-uniformities in the tires mounted on a vehicle give rise to an unacceptable amount of steering pull. However, until the advent of the present invention, accurate resolution of the steering pull exhibited by a vehicle due to tire non-uniformities has been problematic because factors other than tire non-uniformities are reflected in the total pull apparent at the steering wheel of the vehicle. For example, the arched cross-section or "crown" formed in many roads to facilitate water drainage influences the steering pull detectable at the steering wheel of the vehicle. These influences can be negated by making measurements while the vehicle runs on a flat surface. In situations where a suitable flat surface is unavailable, it has been known to correct for measurement errors induced by road crowns by driving the vehicle in opposite directions over the same crowned road surface and then averaging the apparent algebraic steering pull measured over those equal and opposite legs of travel.

A more vexing problem has been the error introduced in steering pull measurements due to the influence of crosswinds acting on the vehicle. A crosswind in a given direction tends to algebraicly increase the steering pull in that direction as measured at the steering wheel of the vehicle. The magnitude of the increase depends on the magnitude of the crosswind, its direction relative the direction of travel of the vehicle and other factors such as the projected cross-sectional area and aerodynamic coefficient of the particular vehicle in the direction of the crosswind. Steering pull measurement error due to crosswinds can be avoided or reduced by making measurements only when winds are suitably calm, but doing so is not always possible or convenient.

It has been attempted to reduce steering pull measurement error induced by crosswinds by averaging the algebraic steering pull values measured at the steering wheel when the vehicle is driven in two opposing directions so that the net influence of crosswinds tends to average toward zero. This technique is not reliable however as the speed and/or direction of crosswinds cannot be relied upon to remain constant while measurements are taken in opposing directions of vehicle travel. Even if prevailing winds remain constant, their apparent direction with respect to the vehicle is subject to change with changes in the direction of the vehicle due to changes in the direction of the course over which it is driven as steering pull measurements are made.

SUMMARY OF THE INVENTION

In view of the foregoing, it is an objective of the invention to provide an apparatus and method for accurately resolving the steering pull generated by non-uniformities of the tires of a vehicle even if the vehicle is driven in the presence of crosswinds.

In accordance with the present invention, a test vehicle is instrumented with an anemometer for generating signals indicative of the direction and speed, respectively, of the wind apparent to the vehicle as it is driven. Those signals, along with a signal indicative of the magnitude and direction of the force which the driver must apply at the perimeter of the steering wheel in one direction or the other in order to keep the vehicle travelling straight ahead are interfaced to a computer. In order to provide accurate measurements of the steering pull generated by non-uniformities of the tires of the vehicle, even in the presence of crosswinds, the computer subtracts from each steering pull measurement sampled from the aforementioned force signal, a wind correction quantity. This wind correction quantity is a function, such as a first or higher order function, of the crosswind component of the average wind multiplied by a calibration factor. The crosswind component of the average wind can be determined as the average indicated wind speed multiplied by the sine of the average indicated wind direction.

BRIEF DESCRIPTION OF THE DRAWINGS

FIG. 1 is a schematic diagram illustrating a preferred embodiment of the invention.

DETAILED DESCRIPTION OF A PREFERRED EMBODIMENT

In order to accurately measure the steering pull induced by non-uniformity of one or more of its tires 10 under actual driving conditions, a test vehicle 11, which is preferably of the same type and model upon which the tires 10 will ultimately be driven, is instrumented with a preferred embodiment of the apparatus 13 of the invention as illustrated in FIG. 1. Referring now to FIG. 1, the steering wheel 14 of the vehicle is outfitted with a clamp 16 having a ball swivel joint 18 which connects the steering wheel 14 to one side of a loadcell 20 by way of a first rigid rod 22. Loadcell 20 may suitably comprise a fifty (50) pound rated type such as a LEBOW 3397 available from Eaton Corp. of Troy, Mich. or equivalent. Loadcell 20 generates a 2 mV/pound double-ended output signal 24 when provided with +/−10 Volt excitation as illustrated. The opposite side of loadcell 20 is connected to a second rigid rod 26 having at its free end a knob 28 of a size to facilitate comfortable grasping by a driver. A support 30, which may suitably comprise a wire suspended from the rear-view mirror of the test vehicle, maintains knob 28 at an approximately fixed vertical level so as to permit the test vehicle 11 to be steered by moving knob 28 back and forth horizontally as indicated in FIG. 1.

The output signal 24 generated by a loadcell 20 is applied to an instrumentation amplifier 32 whose gain is selected to be about 1000× or otherwise as appropriate to provide a full scale output at a force applied to loadcell 20 which is only somewhat higher than the forces to be registered during the taking of data. In the preferred system, a four pound force applied to loadcell 20 produces a five volt signal 34 at the output of amplifier 32. Signal 34 is filtered by a four-pole Butterworth low pass filter 38 in order to generate a conditioned signal 40 which is sampled at the rate of one hundred (100) samples/second by a computer 44 having an analog-to-digital converter (A/D) 46 installed therein. A/D converter 46 may suitably comprise a 12-bit Model DT-2814 available from Data Translation of Marlboro, Mass. or equivalent, while computer 44 may comprise a Model 320 laptop computer available from Dell Computer Corp. of Austin, Tex. or equivalent having an internal memory 48. A commercial spreadsheet software program such as EXCEL available from Microsoft Corp. of Redmond, Wash. or equivalent suitable for carrying out multiple linear regression analysis is installed in computer 44 for a purpose to be explained hereinafter.

Because crosswinds on the test vehicle can introduce error in measuring steering pull, data should be taken when winds are less than about five (5) miles per hour or steps should be taken to cancel wind effects from steering pull measurements. By measuring the wind velocity apparent to the test vehicle while steering pull measurements are being made, the error introduced due to the wind can be determined by repeating steering pull measurements, using the same tires 10, under differing wind conditions.

A suitable measure of apparent wind velocity can be obtained by mounting an anemometer 50, such as one supplied as part of the WEATHER MASTER weather station available from Digitar of Haywood, Calif. or equivalent on the test vehicle. Ideally, the anemometer should be mounted far enough away from the vehicle 11 to ensure that the wind being measured is not influenced by the physical presence of the vehicle. However, for purposes of the present invention, it has been found suitable to mount anemometer 50 about 18–24 inches in front of the test vehicle, aligned with the lateral centerline of the vehicle and with its vertical centerline even with the centroid of the projected side area of the vehicle. The suggested anemometer provides one contact closure per revolution of its wind sensing cups (as indicated by signal 54 in FIG. 1) and a variable resistance to ground proportional to apparent wind direction (as indicated by signal 55 in FIG. 1). As such, the anemometer may readily be interfaced with computer 44 for developing measurements of apparent wind speed and direction. In order to provide correction of steering pull data, computer 44 subtracts from each steering pull measurement a wind correction quantity. The wind correction quantity is a function, such as a first or higher order function, of the crosswind component of the average wind multiplied by a calibration constant. In the preferred embodiment, the crosswind component of the average wind is equal to the product of average wind speed and the sine of the average wind direction.

The calibration constant is determined by driving the test vehicle, equipped with the same tires during the entire calibration procedure, under conditions of varying winds and recording the wind speed, wind direction and steering pull for each of a number of measurement intervals. Care should be taken that a combination of prevailing wind direction and road crowns does not introduce an error into the calibration. Taking relatively equal numbers of measurements in the left and right lanes of interstate highways or conducting the tests on the uncrowned center of a closed test facility will eliminate this potential source of error. To calculate the calibration constant, a linear regression is then performed, using the average wind speed multiplied by the sine of the average wind direction as the independent variable and the steering pull as the dependent variable. Computer 44 then stores the calibration constant for use in calculating the wind correction quantity just described. In usage, wind correction quantity is determined simultaneously with the steering pull data for tires under test and is subtracted from the average steering pull determined during the test.

While the apparatus and method described herein constitute preferred embodiments of the present invention, it is to be understood that the invention is not limited thereby and that in light of the present disclosure, various alternative embodiments will be apparent to persons skilled in the art. For example, while the use of a digital computer is preferred, necessary calculations could also be performed using analog circuits. Accordingly, it is to be recognized that changes can be made without departing from the scope of the invention as particularly pointed out and distinctly claims in the claims set forth below including all legal equivalents thereof.

What is claimed is:

1. An apparatus for measuring, in the presence of wind, the steering pull to which a vehicle is subjected due to non-uniformity of its tires, said apparatus comprising:

apparent wind measuring means mounted proximate the vehicle and in positionally fixed relation thereto for measuring the speed and direction of wind with respect to the vehicle when the vehicle moves in a direction of travel;

force measuring means coupled to a steering member of the vehicle for measuring the force which must be exerted on said member in order to prevent substantial change in said direction of said travel; and computing means operably coupled to said apparent wind measuring means and said force measuring means for generating a steering pull measurement correlated with said force minus a wind correction quantity, said wind correction quantity being determined using a constant value and measurements of said speed and direction of wind made by said apparent wind measuring means.

2. The apparatus of claims 1 further comprising:

memory means in communication with said computing means for storing said constant value.

3. A method for measuring, in the presence of wind, the steering pull to which a vehicle is subjected due to non-uniformity of its tires, said method comprising the steps of:

(a) driving the vehicle on its tires over a surface in a direction of travel;

(b) measuring at a location proximate the vehicle and in positionally fixed relation thereto the direction and speed of the wind apparent to the vehicle;

(c) measuring the force required to be exerted on a steering member of the vehicle in order to maintain its travel in said direction of travel; and (d) generating a steering pull measurement correlated with said force minus a wind correction quantity, said wind correction quantity being determined using a constant value and measurements of said direction and speed of said wind apparent to the vehicle.

4. The method of claim 3 wherein said constant is determined according to a method comprising the steps of:

(a) while driving the vehicle under conditions of varying winds, measuring during each of a plurality of intervals,
  (i) the direction and speed of the wind apparent to the vehicle, and
  (ii) the force required to be exerted on a steering member of the vehicle in order to maintain its travel in a given direction; and (b) performing a linear regression using the average said speed of the wind multiplied by the sine of the average said direction of the wind as an independent variable and said force as a dependent variable.

* * * * *